(12) United States Patent
Zayas et al.

(10) Patent No.: US 6,946,854 B2
(45) Date of Patent: Sep. 20, 2005

(54) RAMP ARRANGEMENT AND METHOD FOR MEASURING THE POSITION OF AN ACTUATOR IN A ROTATING MEDIA DATA STORAGE DEVICE

(75) Inventors: Fernando A. Zayas, Loveland, CO (US); Richard M. Ehrlich, Saratoga, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 209 days.

(21) Appl. No.: 10/349,798

(22) Filed: Jan. 22, 2003

(65) Prior Publication Data

US 2004/0140816 A1 Jul. 22, 2004

(51) Int. Cl.$^7$ .................. G01R 27/02; G11B 21/02
(52) U.S. Cl. ........................ 324/691; 360/75
(58) Field of Search ................ 360/75, 78.06, 360/78.07; 324/714, 716, 691, 695, 696

(56) References Cited

U.S. PATENT DOCUMENTS 5,870,264 A * 2/1999 Restle ..................... 360/135
6,288,982 B1 * 9/2001 Kato ....................... 369/30.36
6,721,125 B2 * 4/2004 Bryant ..................... 360/78.05

* cited by examiner

*Primary Examiner*—Bot Ledynh
(74) *Attorney, Agent, or Firm*—Fliesler Meyer LLP

(57) ABSTRACT

Ramp arrangements and methods in accordance with the present invention can provide the position or velocity of an actuator assembly in a rotating media data storage device while loading or unloading a head connected with the actuator assembly from a disk. One such arrangement comprises a conductive ramp electrically coupled to a conductive suspension lift tab such that a closed circuit is formed when the head is unloaded from the disk. As the suspension lift tab slides along the ramp, the resistance of the circuit changes. By measuring multiple positions at multiple times, a head velocity can be determined. This description is not intended to be a complete description of, or limit the scope of, the invention. Other features, aspects, and objects of the invention can be obtained from a review of the specification, the figures, and the claims.

13 Claims, 5 Drawing Sheets

RAMP ARRANGEMENT AND METHOD FOR MEASURING THE POSITION OF AN ACTUATOR IN A ROTATING MEDIA DATA STORAGE DEVICE

FIELD OF THE INVENTION

The present invention relates to rotating media data storage devices, as for example magnetic or optical hard disk drive technology.

BACKGROUND OF THE INVENTION

Computer systems are fundamentally comprised of subsystems for storing and retrieving data, manipulating data, and displaying results. Nearly all computer systems today use optical, magnetic or magneto-optical storage media to store and retrieve the bulk of a computer system's data. Successive generations of ever more powerful microprocessors, and increasingly complex software applications that take advantage of these microprocessors, have driven the storage capacity needs of systems higher and have simultaneously driven read and write performance demands higher. Magnetic storage remains one of the few viable technologies for economically storing large amounts of data with acceptable read and write performance.

There are basic components common to nearly all magnetic hard disk drives. A hard disk drive typically contains one or more disks clamped to a rotating spindle, heads for reading and writing information to the surfaces of each disk, and an actuator assembly utilizing linear or rotary motion for positioning the head for retrieving information or writing information to a location on the disk. A rotary actuator is a complex assembly that couples a slider on which the head is attached to a pivot point that allows the head to sweep across the surface of the rotating disk.

The disks and the slider can be extremely smooth, and strong adhesive forces can prevent disks from rotating during a "power-on" cycle if the slider is landed on the disk surface. To prevent this phenomenon, modern hard disk drives typically use one of two solutions: (1) a narrow area close to the disk center is textured using a laser to create a special landing zone on the disk, or (2) a load-unload ramp is positioned either adjacent to the disk or just over the disk surface. Where a special landing zone is used, a spiral of tiny laser bumps can be created which increases a disk's roughness, decreases adhesion, and allows the slider to land and take-off from the landing zone. Where a load-unload ramp is used, the suspension is moved beyond the disk area and slides onto the ramp thus parking the head. Both parking on the ramp and landing on the landing zone can increase the drive's non-operational shock resistance and prevent accidental damage during transportation. To prevent damage to the head such as during "power-down" and "power-on" cycles, the velocity of the head must be controlled, particularly when loading from and unloading to a ramp. Current methods for controlling the velocity of the head can be inaccurate, particularly during transitions from low to high current (for example during a "power-on" cycle).

BRIEF DESCRIPTION OF THE FIGURES

Further details of embodiments of the present invention are explained with the help of the attached drawings in which.

DETAILED DESCRIPTION

Figure 1A:
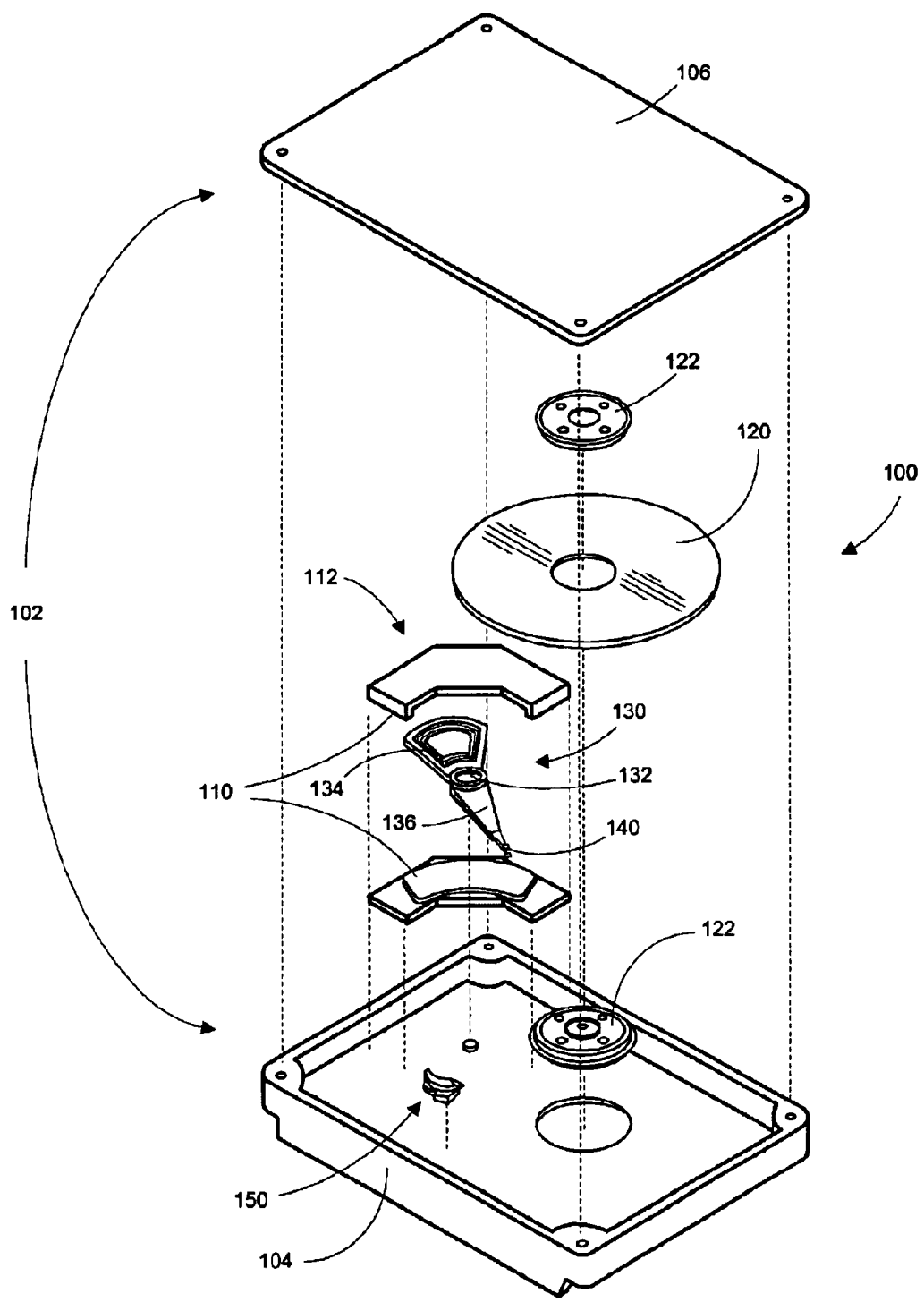
FIG. 1A is an exploded view of a typical hard disk drive utilizing a ramp and a rotary actuator in accordance with one embodiment of the present invention.
Figure 1B:
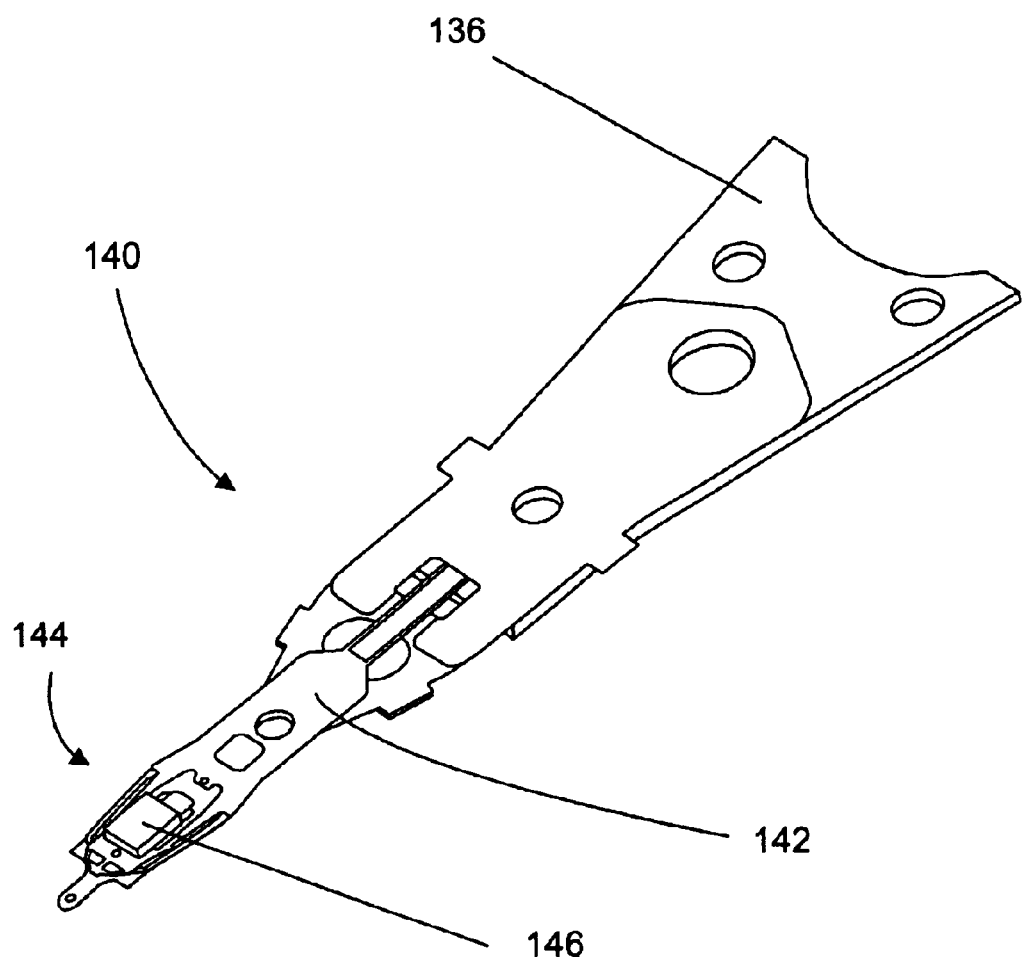
FIG. 1B is a close-up view of a head suspension assembly used in the hard disk drive of FIG. 1A, showing head, slider and suspension.
Figure 1C:
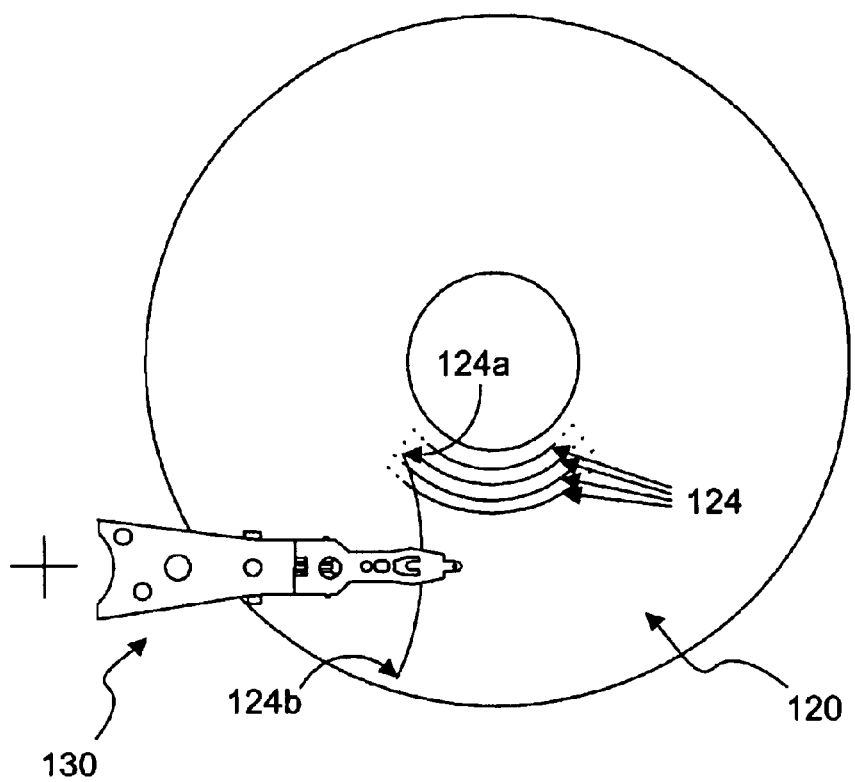
FIG. 1C is an illustration of the rotary motion of a head suspension assembly of FIG. 1B across the surface of a disk.

FIGS. 1A–C illustrate one embodiment of an arrangement 100 contained within a hard disk drive for utilizing a ramp arrangement in accordance with the present invention. FIG. 1A is a partial perspective view of the arrangement 100 that comprises a disk 120 attached to the hub of a spindle 122. The disk 120 can be made of a light aluminum alloy, ceramic/glass or other suitable substrate, with magnetic material deposited on one or both sides of the disk. The magnetic layers have tiny domains of magnetization for storing data transferred through heads. The invention described herein is equally applicable to technologies using other mediums, as for example, optical mediums. Further, the invention described herein is equally applicable to devices having any number of disks attached to the hub of the spindle motor. The disks 120 are connected with the rotating spindle 122 (for example by clamping), spaced apart to allow heads 146 (shown in FIG. 1B) to access the surfaces of each disk, and rotated in unison at a constant or varying rate typically ranging from less than 3,600 to over 15,000 RPM (speeds of 4,200 and 5,400 RPM are common in hard disk drives designed for mobile devices such as laptops).

In a rotary voice coil motor example, an actuator 130 is pivotally mounted to the housing base 104 by a bearing 132 and sweeps an arc, as shown in FIG. 1C, between an inner diameter of the disk 124a and a ramp 150 (not shown in FIG. 1C) positioned near an outer diameter of the disk 124b. Attached to the housing 104 are upper and lower magnet return plates 110 and at least one magnet that together form the stationary portion of the voice coil motor 112. The voice coil 134 is mounted to the actuator 130 and positioned in the air gap of the voice coil motor 112 which applies a force to the actuator 130 to provide the pivoting motion about the bearing 132. The voice coil motor allows for precise radial positioning of the heads 146 across the disk 120. The voice coil motor 112 is coupled with a servo system (not shown) to accurately position the head 146 over a specific track on the disk 120. The servo system acts as a guidance system, using positioning data read by the head 146 from the disk 120 to determine the position of the head 146 over tracks 124 on the disk 120.

The heads 146 (FIG. 1B) read and write data to the disk. Each side of a disk 120 can have an associated head 146, and the heads 146 are collectively coupled to the actuator assembly 130 such that the heads 146 pivot in unison. The invention described herein is equally applicable to devices wherein the individual heads separately move some small distance relative to the actuator (this technology is referred to as dual-state actuation (DSA)).

FIG. 1B details an example of a subassembly commonly referred to as a head suspension assembly (HSA) 140, comprising the head 146 attached to a slider 144, which is further attached to a flexible suspension member (a suspension) 142. The head 146 can be formed on the slider 144 using photolithography and ion milling (for example using reactive ion etching). The spinning of the disk 120 creates air pressure beneath the slider 144 that lifts the slider 144 and consequently the head 146 off of the surface of the disk 120, creating a micro-gap of typically less than one micro-inch between the disk 120 and the head 146 in one embodiment. The suspension 142 can be bent or shaped to act as a spring such that a load force is applied to the surface of the disk. The "air bearing" created by the spinning of the disk 120 resists the spring force applied by the suspension 142, and the opposition of the spring force and the air bearing to one another allows the head 146 to trace the surface contour of the rotating disk surface, which is likely to have minute warpage, without "crashing" against the disk surface. When a head "crashes" the head collides with a surface such that the head and/or the surface is damaged. As is well understood by those of ordinary skill in the art, not all heads ride an air bearing as described above. This invention is also meant to apply to contact recording heads and heads of optical and magneto-optical storage devices that have rotating media.

When not in use, the heads 146 can rest on the stationary disk 120 (typically on an inner portion of the disk that does not contain data) or on a ramp 150 positioned either adjacent to a disk or just over the disk surface. Many hard disk drives utilize ramps because of refinements in disk fabrication. Improved manufacturing techniques have enabled manufacturers to produce ultra-smooth disks. The disks are so smooth that the slider 144 may stick to the stationary disk 120 if the slider 144 is not unloaded before the disk 120 slows down.

Figure 2:
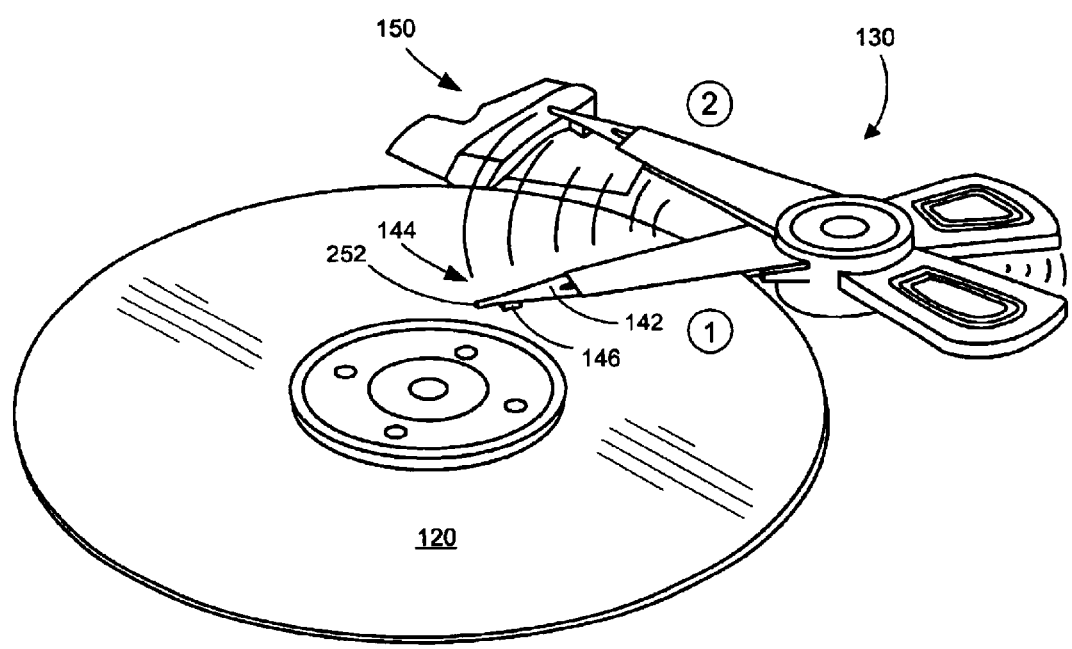
FIG. 2 is a perspective view of the motion of the rotary actuator of FIG. 1A unloading the head from the disk.

FIG. 2 illustrates the motion of the actuator 130 during unloading from an exemplary disk 120 and the positioning of the head 146 and suspension 142 on the ramp 150. The actuator 130 pivots from position 1 where the head 146 is positioned over the surface of the rotating disk 120 to position 2 where the head 146 is positioned adjacent to the disk 120. The head 146 is unloaded from the disk 120 by pivoting the actuator 130 such that a suspension lift tab 252 extending from the suspension 142 contacts the ramp surface and slides up the ramp, which opposes the spring force of the suspension 142 and forces the slider 144 (and the head 146) away from the disk surface. In other embodiments, the suspension 142 does not have a suspension lift tab 252, but rather contacts the ramp 150 such that the ramp is positioned between the head and the pivot point.

Loading the head 146 onto the disk 120 from the ramp 150 may damage the head 146 and/or the disk 120 if the velocity of the head 146 loading from the ramp 150 is not low and controlled. If the head 146 is loaded too quickly the head 146 could crash against the disk surface. If the head 146 is loaded too slowly the head 144, suspended over the disk 120 by the ramp contacting the suspension lift tab 252 (or suspension 142), could repeatedly strike the surface of the rotating disk 120 before the actuator 130 moves completely off of the ramp 150.

Actuator pivot velocity can be calculated using the equation:

$$\omega = \frac{e}{k_v}$$

where e is the back-EMF from the voice coil motor and $k_v$ is the velocity constant determined by the flux density of the permanent magnet(s), the reluctance of the iron core of the voice coil, and the number of turns of the voice coil winding. The back-EMF is the induced voltage generated by the rotation of the voice coil 134 through the fixed flux lines of the permanent magnet(s). Where the change in current is minimal, the back-EMF can be roughly calculated, for example by subtracting the product of the current to the voice coil motor ($I_{vc}$) and the resistance of the voice coil ($R_{vc}$) from the source voltage ($V_{source}$). However, the back-EMF is more accurately calculated using the equation:

$$e = V_{source} - I_{vc} R_{vc} - L_{vc} \frac{d}{dt} I_{vc}$$

where $L_{vc}$ is the inductance of the voice coil. As the change in current to the voice coil increases, the inductance voltage portion of the equation increases, making a rough calculation of back-EMF, and thus a calculation of velocity, less accurate. When loading from the ramp 150 to the disk 120, the current to the voice coil 134 increases, reducing the ability to maintain a constant, low actuator pivot velocity.

Figure 3:
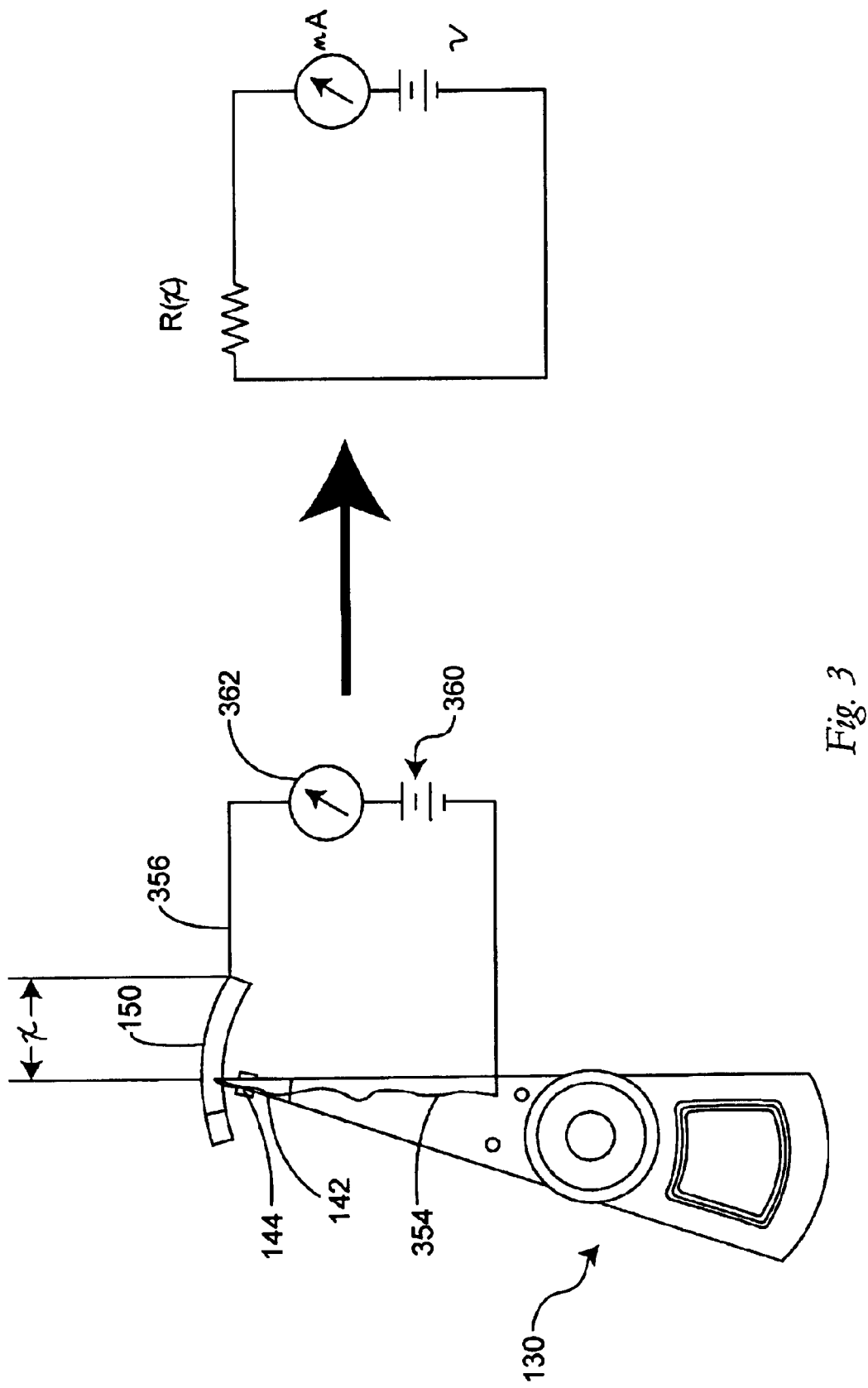
FIG. 3 is a schematic of a circuit formed using the ramp and rotary actuator of FIG. 1A.

FIG. 3 is a schematic of one embodiment of a ramp arrangement for measuring head position in accordance with the present invention. As the actuator 130 pivots away from the center of the disk 120, the suspension lift tab 252 of the suspension 142 contacts and drags along the ramp 150, as described above. The ramp 150 can be made of a conductive material having some resistance, for example steel, or alternatively can be made of a more resistive material, such as a carbon composite. In other embodiments, only a portion of the ramp 150 contacting the suspension 142 when the head 146 is unloaded from the disk 120 is conductive. Similarly, the suspension lift tab 252 is made of conductive material.

The ramp 150 and the suspension lift tab 252 are electrically coupled such that a circuit is completed when the head 146 is unloaded from the disk 120. As the suspension lift tab 252 drags across the ramp 150, the suspension lift tab 252 acts as a wiper for a potentiometer, and the resistance of the circuit changes. A controller (not shown) applies a small voltage 360 to the circuit and measures the current 362 driven by the circuit to determine the resistance of the circuit. Alternatively, the controller applies a small, constant current and measures the resulting voltage across the circuit.

Methods for determining the position or pivot velocity of the actuator in accordance with one embodiment of the present invention are included herein. In one such method the resistance is correlated to a position of the suspension lift tab 252 on the ramp 150. The actuator pivot velocity (and thus the head velocity) can be calculated by measuring multiple positions of the suspension lift tab 252 on the ramp 150 at multiple times, and dividing the change in position by the change in time. Because the actuator pivot velocity can be accurately measured, the head velocity can be carefully controlled during head 146 loading to prevent "crashing" of the head 146 against the surface of the disk 120.

In one embodiment, a wire 354 can be connected from the suspension lift tab 252 to the controller and a wire 356 can be connected from the ramp 150 to the controller. Many hard disk drives comprise rotary actuators 130 having multiple heads 146 connected with multiple suspensions 142 wherein the heads 146 pivot in unison. The velocity of the measured head 146 is approximately the same for each head 146 connected with the rotary actuator 130. If only the velocity of the rotary actuator 130 is sought, a wire 354 to one suspension lift tab 252 and a wire 356 to the ramp 150 is sufficient to determine actuator velocity. One of ordinary skill in the art can contemplate a number of ways to create a circuit between a ramp 150 and a suspension lift tab 252 in contact with the ramp 150. For example, the heads 146 communicate with the control system via a preamplifier (not shown) that can be physically attached to the suspension 142. In one embodiment, the preamplifier can be used to source a small, constant current and to sense the resulting voltage across the ramp 150. In other embodiments a wire 354 can be connected from the suspension lift tab 252 to a power chip (not shown) and a wire 356 can be connected from the ramp 150 to the power chip. In still other embodiments the ramp 150 may be secured to the housing base 104 such that the ramp 150 is grounded, thereby eliminating the need for wire 356.

It may be desired that the position of each head 146 be known, for example where DSA is used. In one embodiment, a wire 354 can be connected with each suspension lift tab 252, and each suspension lift tab 252 can be electrically isolated from every other suspension lift tab 252. A wire 356 can be connected with the ramp 150 and an offset constant compensating for relative distance from the point of measurement can be introduced for each head 146. Alternatively, a wire 356 can be connected with each surface of the ramp 150 that contacts the suspension lift tab 252, and the ramp surfaces can be isolated from one another.

The invention described herein is equally applicable to technologies using other read/write devices and other data storage media. For example, an arrangement in accordance with the embodiments described herein could be used with a rotary actuator connected with a laser or an atomic probe for writing to a polycrystalline silicon substrate. The description and illustrations provided are not intended to limit the invention to magnetic data storage technology.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. An arrangement for measuring the position of a read/write head in a data storage device having a rotatable medium, the read/write head being capable of communicating with the rotatable medium when in communicative proximity, the arrangement comprising:
    an actuator operably associated with said read/write head;
    a ramp electrically connected with the actuator such that a circuit is formed when a portion of the actuator contacts a portion of the ramp;
    wherein the ramp is adapted to remove the read/write head from communicative proximity with the rotatable medium.

2. The arrangement of claim 1, wherein the ramp has a first end and a second end.

3. The arrangement of claim 2, wherein the circuit has a resistance that varies when the portion of the ramp contacting the portion of the actuator varies between the first end and the second end.

4. The arrangement of claim 1, wherein the portion of the actuator is a suspension lift tab.

5. The arrangement of claim 1, wherein the portion of the actuator is a suspension.

6. An arrangement for measuring the position of a read/write head in a data storage device having a rotatable medium, the read/write head being capable of communicating with the rotatable medium when in communicative proximity, the arrangement comprising:
    an actuator; and
    a ramp electrically connected with the actuator;
    wherein the actuator is adapted to be positioned relative to the ramp such that a circuit is formed; and
    wherein the ramp is adapted to remove the read/write head from communicative proximity with the rotatable medium.

7. The arrangement of claim 6, wherein the circuit has a resistance that varies with the relative position of the actuator on the ramp.

8. An arrangement for measuring the velocity of a read/write head in a data storage device having a rotatable medium, the read/write head being capable of communicating with the rotatable medium when in communicative proximity, the arrangement comprising:
    means for positioning said read/write head;
    means for supporting the means for positioning electrically connected with the means for positioning;
    wherein a circuit is formed when the means for positioning is in contact with the means for supporting.

9. A processor adapted to be used in a data storage device having a rotatable medium, a ramp, an actuator and a read/write head operably associated with the actuator and adapted to communicate with the rotatable medium when in communicative proximity, wherein the actuator is in electrical communication with the ramp and forms a circuit when in contact with the ramp, the processor processing instructions for:
    calculating a first position of the actuator on the ramp at a first time based on a first resistance;
    calculating a second position of the actuator on the ramp at a second time based on a second resistance;
    calculating a change in position by subtracting the first position from the second position;
    calculating a change in time by subtracting the first time from the second time; and
    calculating the velocity of the read/write head by dividing the change in position by the change in time.

10. An arrangement for measuring the position of a read/write head in a data storage device having a rotatable medium, the read/write head being capable of communicating with the rotatable medium when in communicative proximity, the arrangement comprising:
    an actuator arm assembly having a suspension lift tab comprising a conductive material;
    a ramp comprising a conductive material; and
    a means for electrically connecting the suspension lift tab with the ramp, such that a closed circuit is formed when the suspension lift tab contacts the ramp.

11. An arrangement for measuring a position of a portion of an actuator on a ramp in a data storage device having a rotatable medium, the actuator being operably associated with a read/write head, the arrangement comprising:
    said portion includes a first conductive material; and
    said ramp includes a second conductive material, said ramp further includes a first end and a second end;
    wherein the second end is electrically grounded;
    wherein one of a current and a voltage can be measured when said portion contacts said ramp between the first end and the second end;
    wherein the ramp is adapted to remove the read/write head from communicative proximity with the rotatable medium.

12. The arrangement of claim 11, wherein said portion is a suspension lift tab.

13. The arrangement of claim 11, wherein said portion is a suspension.

* * * * *